US010491098B2

(12) United States Patent
Chen et al.

(10) Patent No.: US 10,491,098 B2
(45) Date of Patent: Nov. 26, 2019

(54) SOFT SWITCHING SOLID STATE TRANSFORMERS AND CONVERTERS

(71) Applicant: Georgia Tech Research Corporation, Atlanta, GA (US)

(72) Inventors: Hao Chen, Atlanta, GA (US); Deepakraj M. Divan, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 16/302,356

(22) PCT Filed: May 17, 2017

(86) PCT No.: PCT/US2017/033186
§ 371 (c)(1),
(2) Date: Nov. 16, 2018

(87) PCT Pub. No.: WO2017/201209
PCT Pub. Date: Nov. 23, 2017

(65) Prior Publication Data
US 2019/0280586 A1 Sep. 12, 2019

Related U.S. Application Data

(60) Provisional application No. 62/337,512, filed on May 17, 2016.

(51) Int. Cl.
*H02M 1/08* (2006.01)
*H02M 1/12* (2006.01)
(Continued)

(52) U.S. Cl.
CPC ............ *H02M 1/083* (2013.01); *H02M 1/126* (2013.01); *H02M 1/4208* (2013.01); *H02M 1/44* (2013.01);
(Continued)

(58) Field of Classification Search
CPC ............ H02M 3/335; H02M 3/33584; H02M 2007/4811; H02M 2007/4815
(Continued)

(56) References Cited

U.S. PATENT DOCUMENTS 5,027,264 A 6/1991 Dedoncker et al.
5,742,495 A 4/1998 Barone
(Continued)

OTHER PUBLICATIONS

International Search Report and Written Opinion in co-pending, related PCT Application No. PCT/US2017/33186, dated Aug. 11, 2017.
(Continued)

*Primary Examiner* — Gary A Nash
(74) *Attorney, Agent, or Firm* — Thomas Horstemeyer, LLP

(57) ABSTRACT

Various examples are provided for soft switching solid state transformers and converters, and their operation and application. In one example, a soft switching solid state power transformer includes a high frequency (HF) transformer; first and second auxiliary resonant circuits coupled to the HF transformer; and first and second current-source inverter (CSI) bridges coupled to the corresponding first auxiliary resonant circuits. The first and second CSI bridges include reverse blocking switch assemblies that conduct current in one direction and block voltage in both directions. In another example, a reactive power compensator includes a high frequency (HF) transformer, first, second and third auxiliary resonant circuits coupled to the HF transformer, and first, second and third current-source inverter (CSI) bridges coupled to the corresponding first auxiliary resonant circuits. In another example, a converter includes an auxiliary resonant circuit coupled across an inductor and first and second CSI bridges coupled across the inductor.

22 Claims, 13 Drawing Sheets

(51) Int. Cl.
*H02M 5/458* (2006.01)
*H02M 5/22* (2006.01)
*H02M 1/44* (2007.01)
*H02M 3/335* (2006.01)
*H02M 1/42* (2007.01)
*H02M 1/00* (2006.01)
*H02M 7/48* (2007.01)

(52) U.S. Cl.
CPC ....... *H02M 3/33576* (2013.01); *H02M 5/225* (2013.01); *H02M 5/4585* (2013.01); *H02M 3/335* (2013.01); *H02M 3/3353* (2013.01); *H02M 3/33584* (2013.01); *H02M 2001/0058* (2013.01); *H02M 2007/4811* (2013.01); *H02M 2007/4815* (2013.01)

(58) Field of Classification Search
USPC ................... 363/16–19, 21.02, 21.03, 71, 98
See application file for complete search history.

(56) References Cited

U.S. PATENT DOCUMENTS

| | | | |
|---|---|---|---|
| 8,988,900 B2 | 3/2015 | Toliyat et al. | |
| 9,065,321 B2* | 6/2015 | Divan | H02M 1/00 |
| 9,329,596 B2 | 5/2016 | Cima | |
| 2007/0171680 A1* | 7/2007 | Perreault | H02M 1/34 363/16 |
| 2011/0292705 A1 | 12/2011 | Fornage | |
| 2011/0310642 A1 | 12/2011 | Dai et al. | |
| 2014/0104893 A1* | 4/2014 | Pan | H02M 3/337 363/21.02 |
| 2015/0003115 A1* | 1/2015 | Barron | H02M 1/08 363/17 |

OTHER PUBLICATIONS

"Topology and Analysis in PWM Inversion, Rectification, and Cycloconversion" by K.D.T. Ngo, Ph.D. dissertation, California Institute of Technology, May 1984.
"A three-phase AC/AC high-frequency link matrix converter for VSCF applications" by H. Ju Cha and P. Enjeti, 2003 IEEE Power Electronics Specialist Conference, pp. 1971-1976, Jun. 2003.

* cited by examiner

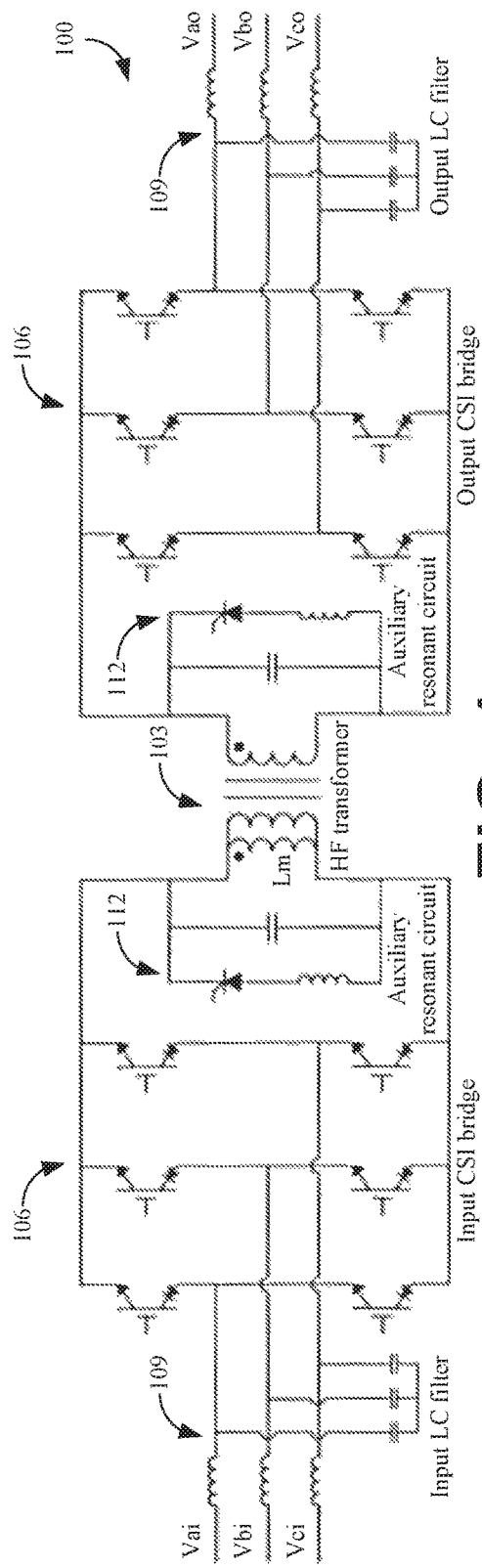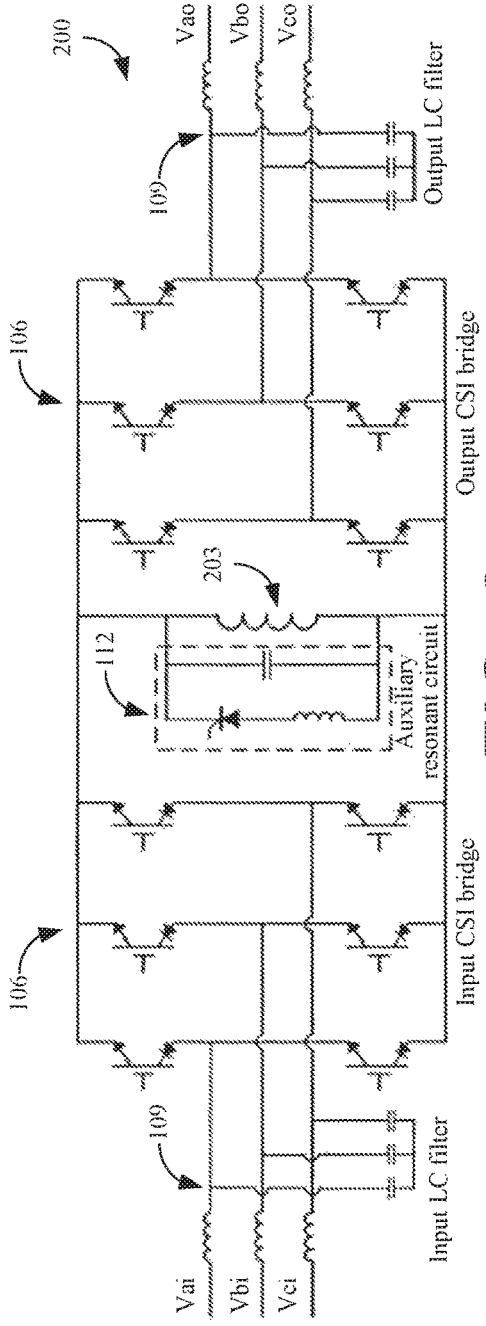
FIG. 1
FIG. 2

| Topology | Active Device Count | Soft-Switching | DC Caps | XFMR Frequency | Device V/I Rating | Fault Current | Efficiency |
|---|---|---|---|---|---|---|---|
| Soft-switching solid state transformer (S4T) | 12 (main) +2 (auxiliary) | Full range | -- | 15 kHz | 1 p.u./ 2 p.u. | 2 p.u. | 97.4% |
| DAB based multi-stage SST | 20 | DC/DC only with a limited range | 2 | 15 kHz | 1 p.u./ 1 p.u. | >10 p.u. | 93% |
| Low-frequency transformer with rectifier and inverter | 12 | No | 1 | 60 Hz | 1 p.u./ 1 p.u. | >10 p.u. | 91.5% |

SOFT SWITCHING SOLID STATE TRANSFORMERS AND CONVERTERS

CROSS REFERENCE TO RELATED APPLICATIONS

This application is the 35 U.S.C. § 371 national stage application of PCT Application No. PCT/US2017/033186, filed May 17, 2017, which claims priority to, and the benefit of, U.S. provisional application entitled "Soft Switching Solid State Transformer" having Ser. No. 62/337,512, filed May 17, 2016, both of which are hereby incorporated by reference in their entireties.

BACKGROUND

Isolated power converters cover a broad range of applications from customer electronics to bulky power system. The converter can be capable of connecting with direct current (DC), single-phase and/or multi-phase alternating current (AC) power sources or loads. When compared with low-frequency isolation links, the high frequency isolation can result in significant savings in volume and weight of magnetic materials. In addition, the converter/inverter bridges provide various intelligence such as bi-directional power flow control, harmonic suppression, VAr support, DC and multi-terminal interfacing, voltage regulation, and fault isolation.

SUMMARY

Aspects of the present disclosure are related to soft switching solid state transformers and converters, and their operation and application.

In one aspect, among others, a soft switching solid state power transformer comprises a high frequency (HF) transformer comprising first and second winding connections; a first auxiliary resonant circuit coupled to the first winding connection of the HF transformer, the first auxiliary resonant circuit comprising a resonant capacitor coupled across the first winding connection; a first current-source inverter (CSI) bridge coupled to the first auxiliary resonant circuit, the first CSI bridge comprising reverse blocking switch assemblies that conduct current in one direction and block voltage in both directions; a second auxiliary resonant circuit coupled to the second winding connection of the HF transformer, the second auxiliary resonant circuit comprising a resonant capacitor coupled across the second winding connection; and a second CSI bridge coupled to the second auxiliary resonant circuit, the second CSI bridge comprising reverse blocking switch assemblies that conduct current in one direction and block voltage in both directions.

In one or more aspects, the first CSI bridge can comprise at least two phase legs, each phase leg comprising a pair of the reverse blocking switch assemblies. The first CSI bridge can comprise three phase legs, each of the three phase legs configured to couple to a different phase of an AC power supply. The first CSI bridge can further comprise a fourth phase leg configured to couple to a neutral connection of the AC power supply. The at least two phase legs of the first CSI bridge can be configured to couple to a single-phase AC power supply or a DC power supply. The soft switching solid state power transformer can further comprise a first filter coupled to the at least two phase legs of the first CSI bridge. The reverse blocking switch assemblies can comprise an insulated gate bipolar transistor (IGBT) in series with a diode or a reverse blocking IGBT (RB-IGBT).

In one or more aspects, the second CSI bridge can comprise at least two phase legs comprising a pair of the reverse blocking switch assemblies. The at least two phase legs can be configured to couple to a load, a power bus, or a power supply. The load can be a single-phase AC load or a DC load. The load can be a three-phase AC load, and the second CSI bridge can comprise three phase legs configured to couple to different phases of the load. The second CSI bridge can further comprise a fourth phase leg configured to couple to a neutral connection of the load. The soft switching solid state power transformer can further comprising a second filter coupled to the at least two phase legs of the second CSI bridge.

In another aspect, a reactive power compensator comprises a high frequency (HF) transformer comprising first, second and third winding connections; a first auxiliary resonant circuit coupled to the first winding connection of the HF transformer, the first auxiliary resonant circuit comprising a resonant capacitor coupled across the first winding connection; a first current-source inverter (CSI) bridge coupled to the first auxiliary resonant circuit, the first CSI bridge comprising reverse blocking switch assemblies that conduct current in one direction and block voltage in both directions; an second auxiliary resonant circuit coupled to the second winding connection of the HF transformer, the second auxiliary resonant circuit comprising a resonant capacitor coupled across the second winding connection; a second current-source inverter (CSI) bridge coupled to the second auxiliary resonant circuit, the second CSI bridge comprising reverse blocking switch assemblies that conduct current in one direction and block voltage in both directions; a third auxiliary resonant circuit coupled to the third winding connection of the HF transformer, the third auxiliary resonant circuit comprising a resonant capacitor coupled across the third winding connection; and a third CSI bridge coupled to the third auxiliary resonant circuit, the third CSI bridge comprising reverse blocking switch assemblies that conduct current in one direction and block voltage in both directions. In one or more aspects, the first, second and third CSI bridges can comprise two phase legs, each phase leg comprising a pair of the reverse blocking switch assemblies. The first, second and third CSI bridges can be configured to couple to different phases of a three-phase AC power supply. The two phase legs of each of the first, second and third CSI bridges can be configured to couple to a phase connection and a common neutral connection. The reverse blocking switch assemblies can comprise an insulated gate bipolar transistor (IGBT) in series with a diode or a reverse blocking IGBT (RB-IGBT).

In another aspect, a soft switching solid state converter comprises an auxiliary resonant circuit coupled across an inductor, the first auxiliary resonant circuit comprising a resonant capacitor coupled across the inductor; a first current-source inverter (CSI) bridge coupled across the inductor, the first CSI bridge comprising reverse blocking switch assemblies that conduct current in one direction and block voltage in both directions; and a second CSI bridge coupled across the inductor, the second CSI bridge comprising reverse blocking switch assemblies that conduct current in one direction and block voltage in both directions. In one or more aspects, the first and second CSI bridges can each comprise at least two phase legs, each phase leg comprising a pair of the reverse blocking switch assemblies. The first CSI bridge can comprise three phase legs, each of the three phase legs configured to couple to a different phase of an AC power supply. The first CSI bridge can further comprise a fourth phase leg configured to couple to a neutral connection of the AC power supply. The at least two phase legs of the first CSI bridge can be configured to couple to a single-phase AC power supply or a DC power supply.

In one or more aspects, the soft switching solid state power converter can further comprise a first filter coupled to the at least two phase legs of the first CSI bridge. The reverse blocking switch assemblies can comprise an insulated gate bipolar transistor (IGBT) in series with a diode or a reverse blocking IGBT (RB-IGBT). In one or more aspects, the second CSI bridge can comprise at least two phase legs comprising a pair of the reverse blocking switch assemblies. The at least two phase legs can be configured to couple to a load, a power bus, or a power supply. The load can be a single-phase AC load or a DC load. The load can be a three-phase AC load, and the second CSI bridge can comprise three phase legs configured to couple to different phases of the load. The second CSI bridge can further comprise a fourth phase leg configured to couple to a neutral connection of the load. The soft switching solid state power converter can further comprising a second filter coupled to the at least two phase legs of the second CSI bridge.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 is a schematic diagram illustrating an example of a soft switching isolated transformer topology for conversion of three-phase AC power to three-phase AC power, in accordance with various embodiments of the present disclosure.

FIG. 2 is a schematic diagram illustrating an example of a soft switching non-isolated converter topology for conversion of three-phase AC power to three-phase AC power, in accordance with various embodiments of the present disclosure.

DETAILED DESCRIPTION

Figure 3:
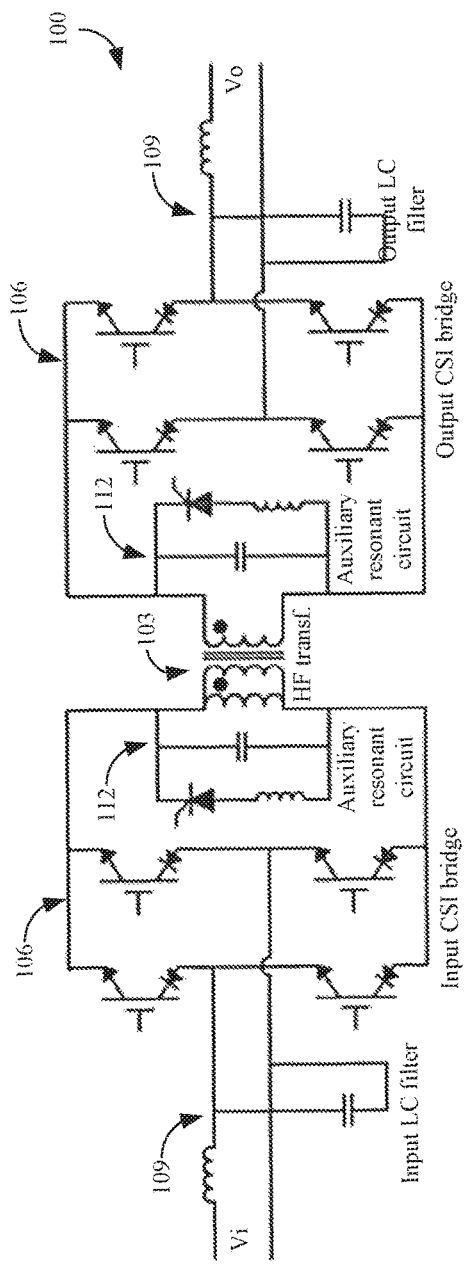
FIGS. 3-7 are schematic diagrams illustrating examples of soft switching isolated transformer topologies for conversion of DC, single-phase and three-phase AC power to DC, single-phase and three-phase AC power, in accordance with various embodiments of the present disclosure.

Disclosed herein are various embodiments related to soft switching solid state transformers and converters. Reference will now be made in detail to the description of the embodiments as illustrated in the drawings, wherein like reference numbers indicate like parts throughout the several views.

Conventionally, a three-stage conversion is used when converting AC power to AC power or AC power to DC power with galvanic isolation. It comprises of a rectifier, an isolated DC/DC converter which is commonly a dual active bridge (DAB) converter, and an inverter if the AC power is connected to the end. However, the poor efficiency and low reliability of this expensive and complex structure limits its actual application. In addition, the DAB has a limited range for soft-switching, and its input and output voltages need to have very small ripples, which in turn requires a large electrolytic capacitor for filtering. Especially when connecting with single-phase AC power, the filter capacitors will become even larger to smooth the 120 Hz voltage ripple.

Isolated power conversion using isolated matrix converter reduces the number of conversion stages, and removes the DC capacitor while utilizing 24 devices for three-phase bi-directional power conversion. However, the four-quadrant operation of the matrix converter uses a complex switch commutation sequence that is dependent on accurate assessment of the current and voltage polarity on the switches being commutated. Soft-switching topologies that include an AC-link or partial resonant AC-link which are zero-current-switching (ZCS) and zero-voltage-switching (ZVS) topologies, respectively, experience unacceptably high device stresses.

A three-phase, four-quadrant flyback cycloconverter with high-frequency isolation is a minimal three-phase solid state transformer (SST) topology that can achieve four-quadrant three-phase AC/AC power conversion with only 12 devices. However, several important elements such as analysis, control, operation, and implementation of such a converter have been missing. Especially, the energy trapped within the transformer leakage inductance was not discussed, which, if not managed property at bridge-to-bridge transitions, will have the converter operation fail. The isolated dynamic current converters (Dyna-C) in U.S. Pat. No. 9,065,321, which is entitled "Isolated dynamic current converters" and is hereby incorporated by reference in its entirety, presented theoretically loss-less bridge transitions by introducing an additional switching state. In addition, this patent discussed the operation and control of the converter such that a compact transformer design could be achieved. It also disclosed configurations for two- or multi-terminals DC, single- and multi-phase AC systems, as well as series stacking the modules to reach medium voltage and high power. However, several severe issues were present when implementing this converter. It was found that high-voltage stress developed across devices during bridge-to-bridge transitions because of the diode reverse recovery issue. In addition, for the device phase-leg transitions within the same bridge, a high voltage spike was developed due to layout parasitic elements. Hard-switching transitions at 2 p.u. (per unit) current stress along with high dv/dt rates lead to high device loss and severe electromagnetic interference (EMI). Complicated device snubbers, fast sensing gate drivers, and bulky converter protection circuits had to be included to prevent the converter from catastrophic failure under abnormal operation. All of the above issues resulted in poor converter reliability as well as very low converter efficiency.

This disclosure introduces isolated power conversion circuits, which retain all the benefits of the four-quadrant flyback cycloconverter and eliminate all the above issues. With a minimal auxiliary resonant circuit, all the devices of the converter are switched under soft-switching conditions. The disclosed configuration significantly improves the converter efficiency by removing the switching loss and mitigating the EMI issue thanks to the controllable dv/dt rate. The converter is highly immune to layout parasitic elements, and the protection scheme can be readily implemented. In addition, the converter operation is simplified by removing the leakage management states for bridge transitions and the overlap states for phase-leg transitions. While much of the discussion refers to solid state transformers or converters, the disclosed aspects, embodiments and variations are equally applicable to both solid state transformers including a high frequency (HF) transformer and converters and compensators including an HF transformer or inductor.

Referring to FIG. 1, shown is an example of a soft switching isolated converter topology for conversion of three-phase AC power to three-phase AC power. An isolated transformer or converter 100 comprises of four elements: 1) a high-frequency (HF) transformer 103 to provide galvanic isolation and an amount of energy storage; 2) current-source inverter (CSI) bridges 106 to interlace with sources and loads; 3) terminal LC filters 109 for suppressing harmonics; and 4) auxiliary resonant circuits 112 to provide ZVS switching conditions for all the main devices. The HF transformer 103 can be an air-gapped HF transformer. The CSI bridges 106 are configured with switches in the phase legs that conduct current in one direction but block voltage in both directions, which can be implemented with either an insulated gate bipolar transistor (IGBT) in series with a diode or a reverse blocking IGBT (RB-IGBT). The auxiliary resonant circuits 112 comprise an active device, an inductor and a capacitor. The active device can be an IGBT in series with a diode, a RB-IGBT, or a thyristor. Two auxiliary resonant circuits 112 may be required to provide ZVS transitions for the devices of the input and output CSI bridges 106, respectively, due to the transformer leakage inductance. However, if high frequency isolation is not needed, then the HF transformer 103 can be replaced by an inductor 203, and only one auxiliary resonant circuit 112 is needed as illustrated by the example of the non-isolated converter 200 in FIG. 2.

The disclosed converter topologies of FIGS. 1 and 2 can provide the following functionalities: 1) bi-directional power flow; 2) voltage step-up and step-down; and 3) arbitrary power factors and frequencies for the input and the output. The disclosed converters 100 and 200 retain all the Dyna-C benefits including: 1) eliminating the bulky DC energy storage capacitors; 2) being free of inrush current; 3) providing fast dynamic current control by directly regulating injected line currents: and 4) comprising a modular structure to scale to high-voltage and high-power levels.

Unlike other resonant converters which require complex switching operation to achieve soft-switching and sometimes even lose the pulse-width modulation capability, the operating scheme of the converter circuits of FIGS. 1 and 2 is extremely simple to implement since the auxiliary resonant circuit(s) 112 is only active once during each switching cycle. The auxiliary resonant circuit 112 is minimally involved in the main converter transition and thus its losses are quite low. Also, when compared with other soft-switching converters, the disclosed converters 100 and 200 can achieve soft-switching for a full load range with a fixed switching frequency. In addition, the disclosed converter topologies of FIGS. 1 and 2 offer several very important features that conventional voltage-source inverters (VSIs) and current-source inverters (CSIs) do not have: 1) the converters 100 and 200 do not require any intentionally added dead time or overlap time for device transitions; 2) there is no severe inrush current when switching devices on the same phase leg of a CSI bridge 106 are turned-on simultaneously; 3) devices do not suffer from catastrophic voltage stress when interrupting the inductive current flowing through the path; and 4) because of the reduced dv/dt rate, protection of all the devices can be achieved by simply connecting MOVs (metal oxide varistors) across the HF transformer 103 (FIG. 1).

In addition to the three-phase AC/AC configurations of FIGS. 1 and 2, the converter topology can also be configured to interface with single- or multi-terminal DC and single- or multi-phase AC systems. By adding and/or removing phase legs in one or both of the CSI bridge(s) 106, the converter topology can be configured to interface with DC, single-phase AC, or three-phase AC systems. Similarly, by adding one or more additional CSI bridge(s) 106 and transformer windings, a multi-terminal configuration can be realized. FIGS. 3-7 illustrate examples of isolated converter configurations for DC, single-phase, three-phase and multi-port applications. As discussed with respect to FIG. 2, the HF transformer 103 and auxiliary resonant circuits 112 can be replaced with the inductor 203 and single auxiliary circuit 112 to provide a corresponding non-isolated converter configuration.

Figure 4:
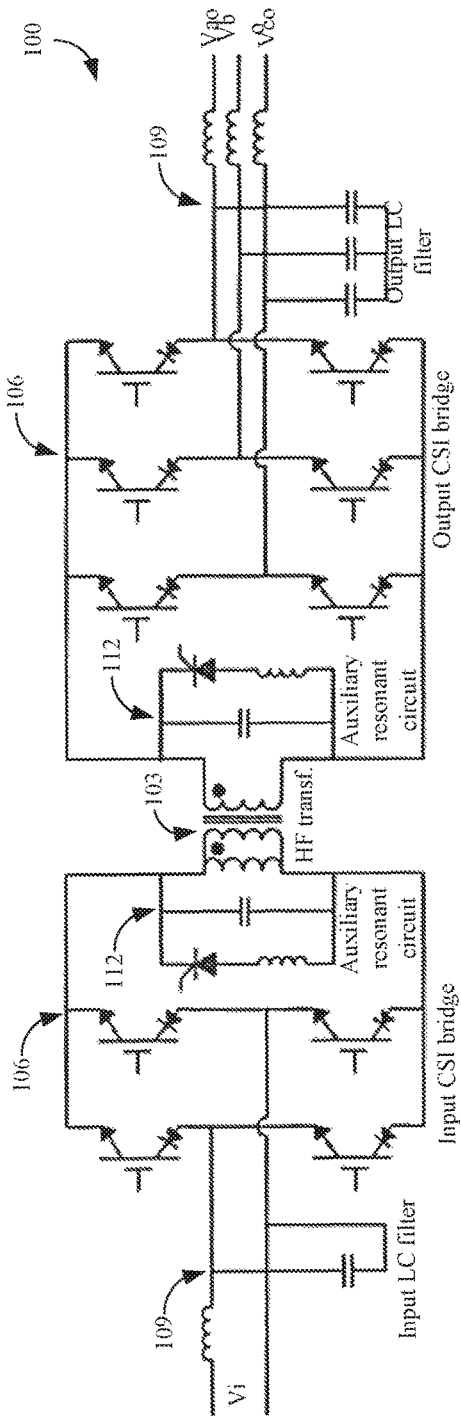
Figure 5:
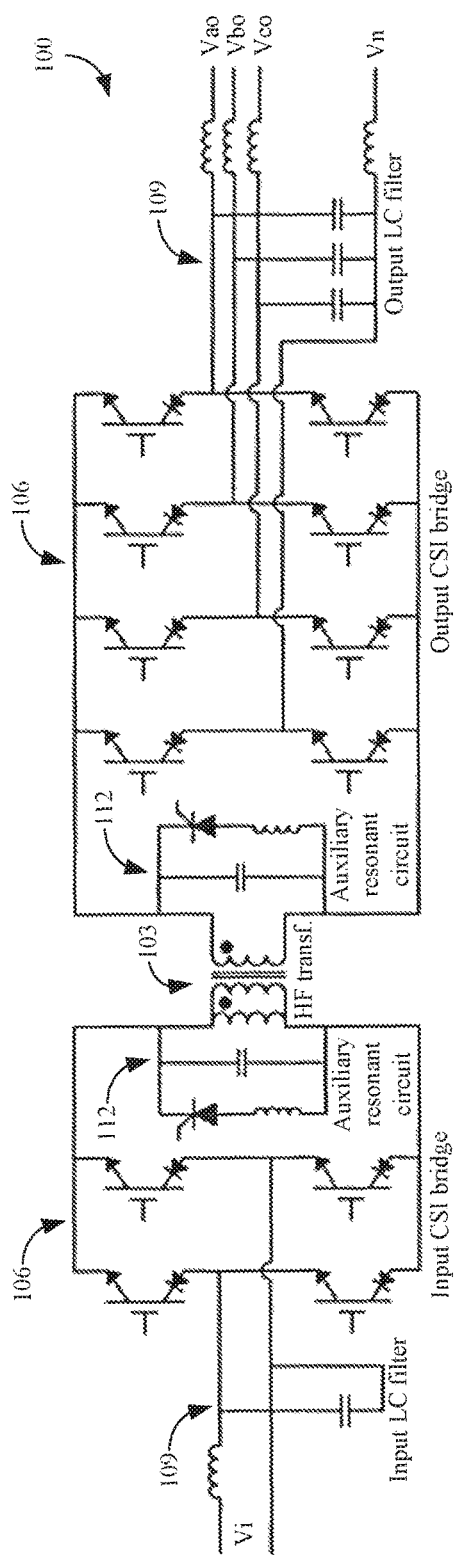
Figure 6:
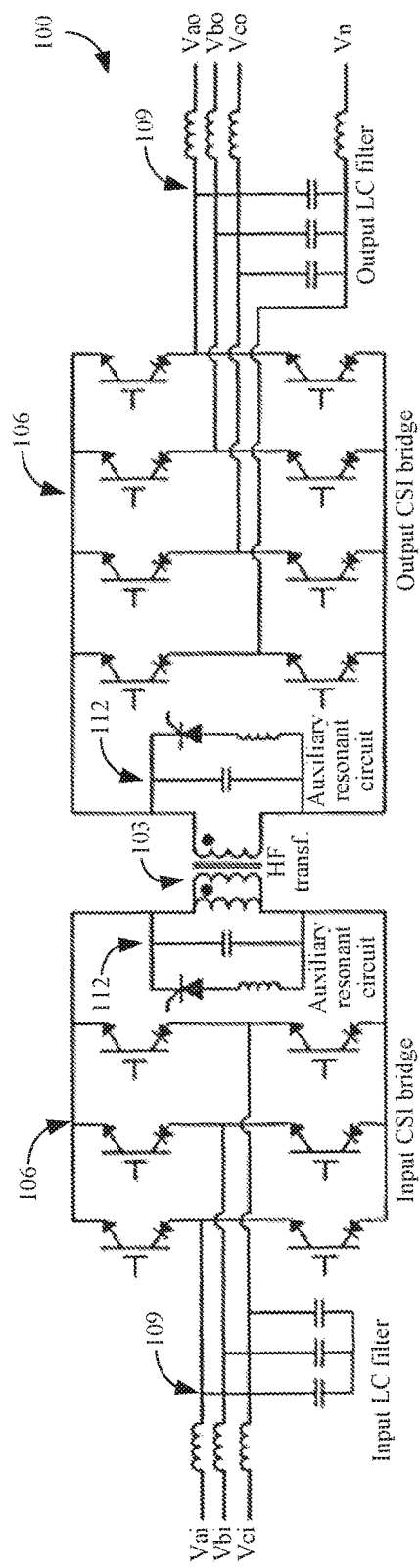

Referring to FIG. 3, shown is an example of a converter topology suitable for conversion of DC or single-phase AC to DC or single-phase AC. As can be seen, the HF transformer 103 and auxiliary resonant circuits 112 are the same as in FIG. 1. The number of phase legs of the CSI bridges 106 and the terminal LC filters 109 have been reduced to correspond to the two wire connections for the DC or single-phase AC input and output. FIG. 4 illustrates a converter topology suitable for conversion of DC or single-phase AC to three-phase AC with a three-wire connection. The converter topology can be modified as shown in FIG. 5 for a four-wire three-phase AC configuration. As illustrated in FIG. 5, a fourth phase leg has been added to the CSI bridge 106 for the neutral line on the three-phase AC side, which is coupled to the common point of the capacitors in the terminal LC filter 109. The four-wire configuration can interface with an unbalanced three-phase AC system. FIG. 6 illustrates a converter topology suitable for conversion of three-wire three-phase AC to four-wire three-phase AC. As can be understood, the illustrated topologies of FIGS. 3-6 can be reversed or modified to provide for other converter configurations. Non-isolated converter configurations can be achieved by simply replacing the HF transformer 103 with an inductor 203 and using only one auxiliary resonant circuit 112 as shown in FIG. 2.

Figure 7:
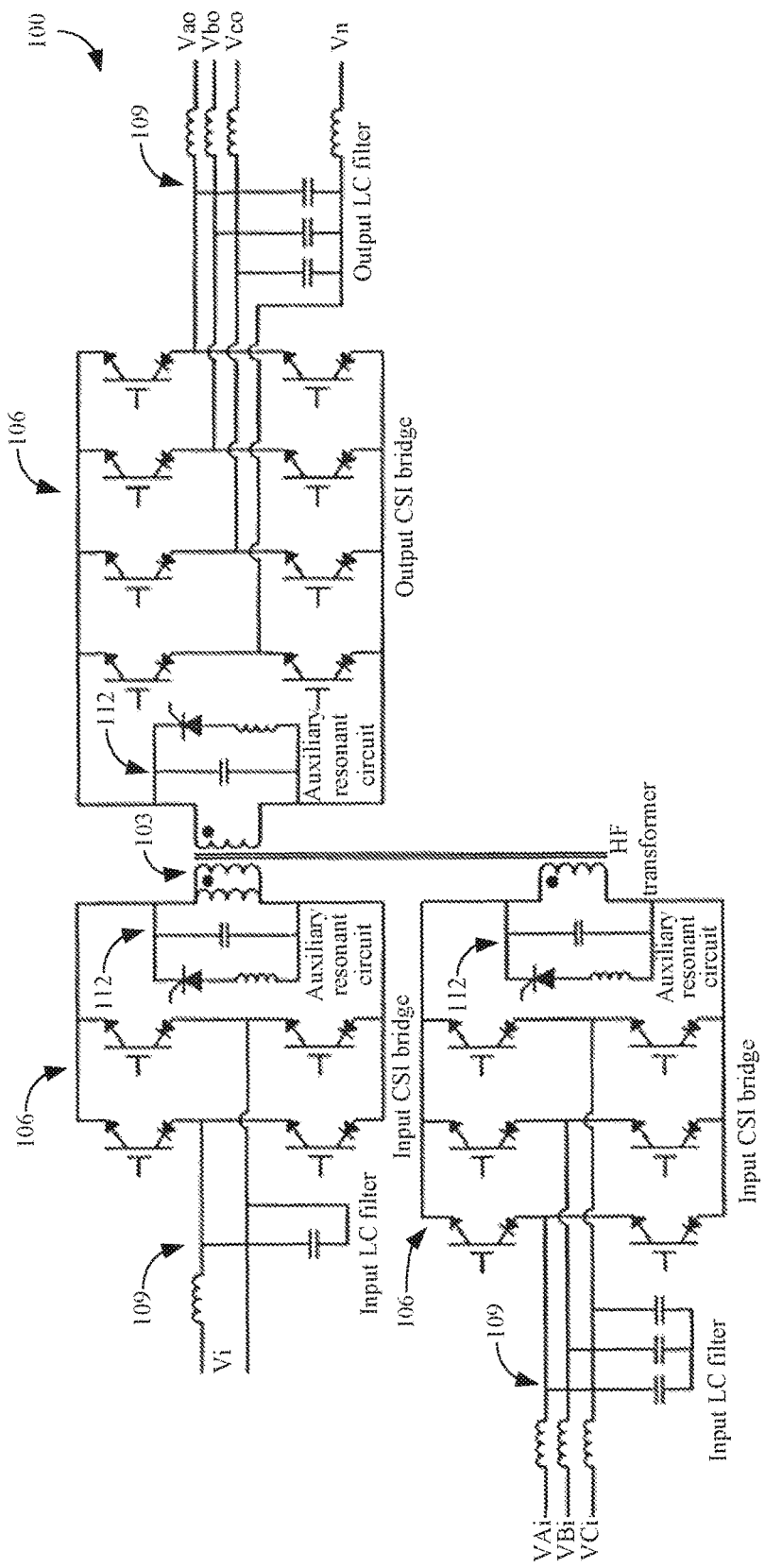

The disclosed converter topologies can also be configured to provide multi-port arrangements. FIG. 7 shows a three-port configuration suitable for conversion between DC or single-phase AC to DC, three-wire three-phase AC, and four-wire three-phase AC. A multi-winding HF transformer 103 provides isolation between the three sides of the converter. Additional ports or different conversion combinations can be provided as can be understood. A non-isolated converter configuration can be achieved with an inductor 203 and auxiliary resonant circuit 112 as illustrated in FIG. 2.

Figure 8:
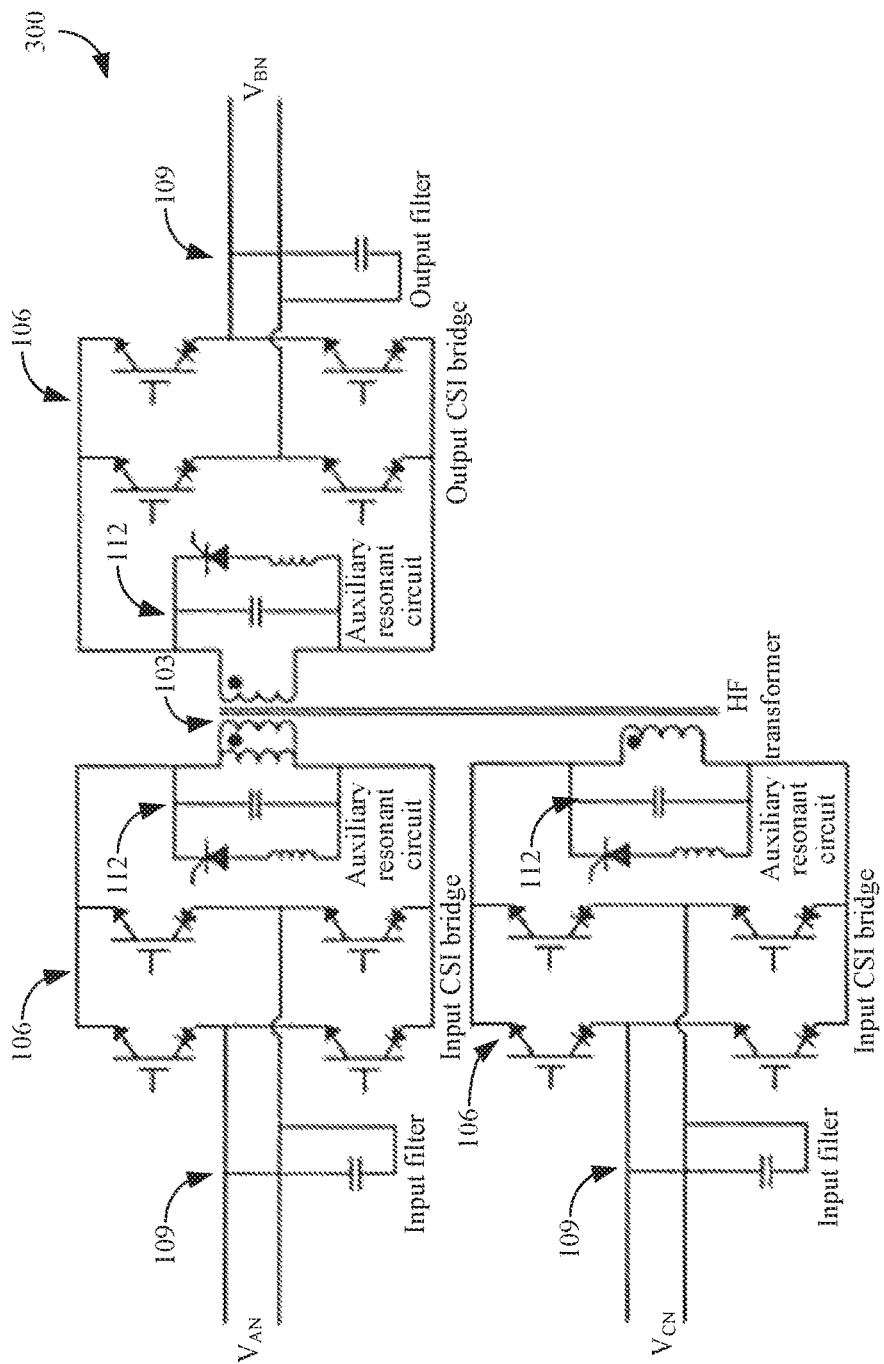
FIG. 8 is a schematic diagram illustrating an example of a reactive power (VAr) compensator, in accordance with various embodiments of the present disclosure.

The disclosed converter topologies can also be configured as a VAr compensator 300 as shown in FIG. 8. Three single-phase CSI bridges 106 are coupled together through a three-winding HF transformer 103. The two wire connection to each CSI bridge 106 is coupled between the power line and neutral line of a three-phase grid. The converter injected current can be controlled to either lead or lag the voltage by 90 degrees.

Figure 9A:
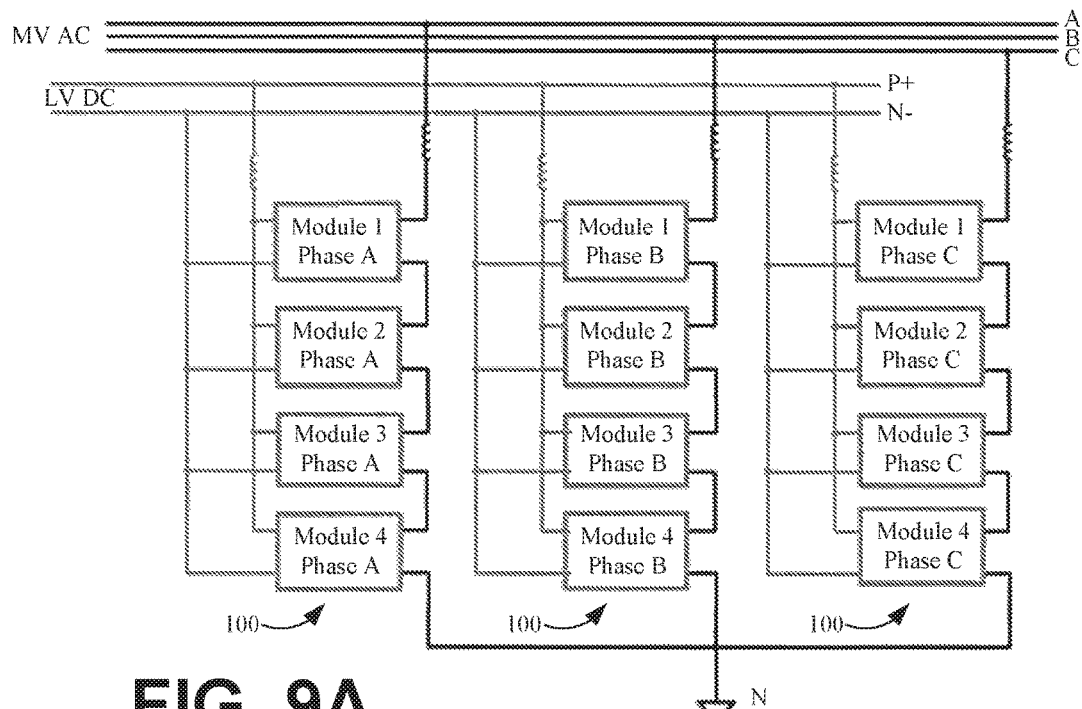
FIGS. 9A and 9B are schematic diagrams illustrating examples of multi-level converters comprising the transformer topologies of FIGS. 1 and 3-7, in accordance with various embodiments of the present disclosure.
Figure 9B:
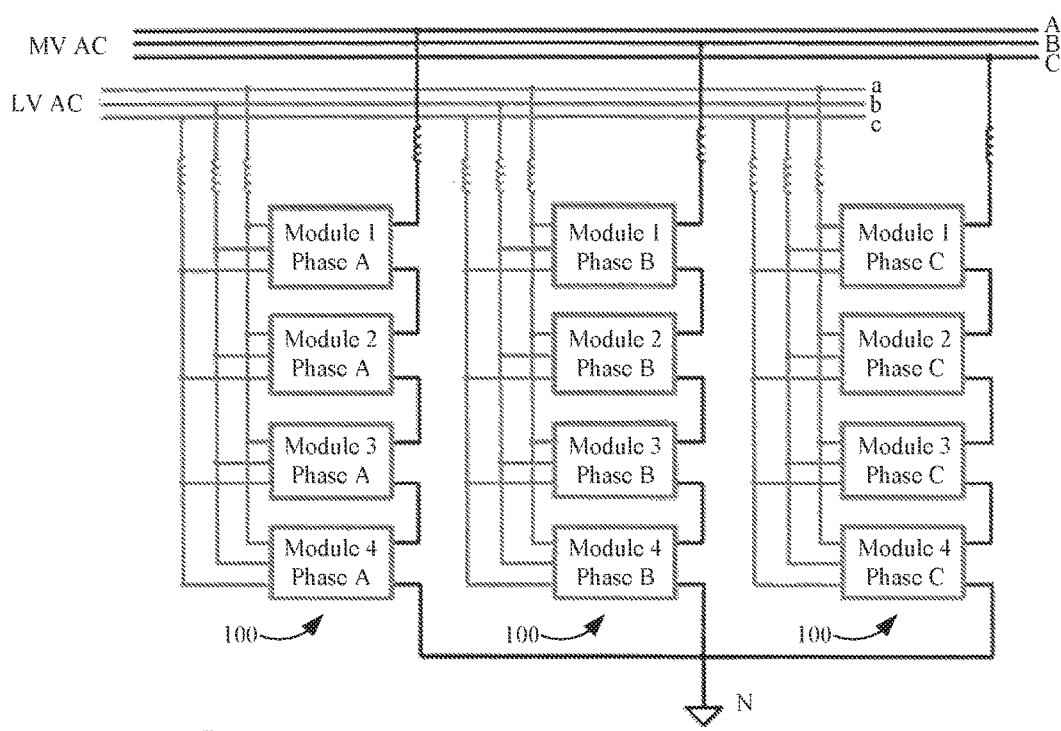

For high-voltage high-power applications, isolated converter modules can be connected in series and/or in parallel to achieve a desired voltage level and/or share the voltage and current loading. Referring to FIG. 9A, shown is an example of a DC to medium voltage (MV) three-phase AC multi-level converter using a plurality of DC to single-phase AC converter modules 100 such as the example illustrated in FIG. 3. The configuration of FIG. 9A converts low voltage (LV) DC to MV three-phase AC using four levels of converter modules 100. The converter modules 100 are connected in parallel on the high current side and in series on high voltage side to share the currents and voltages, respectively. By utilizing this configuration, the low voltage DC can be stepped up to provide the appropriate voltage level for the MV three-phase AC. FIG. 9B shows an example of a LV three-phase AC to MV three-phase AC multi-level converter 100 using a plurality of three-phase AC to single-phase AC converter modules 100 such as the example illustrated in FIG. 4. The configuration of FIG. 9B converts LV AC to MV three-phase AC using four levels of converter modules 100. While both FIGS. 9A and 9B illustrate the use of four converter modules 100 per phase, other numbers of converter modules 100 can be used to achieve the desired voltage levels. Other stacked converter module configurations are possible using the converter topologies of FIGS. 1-7.

Figure 10:
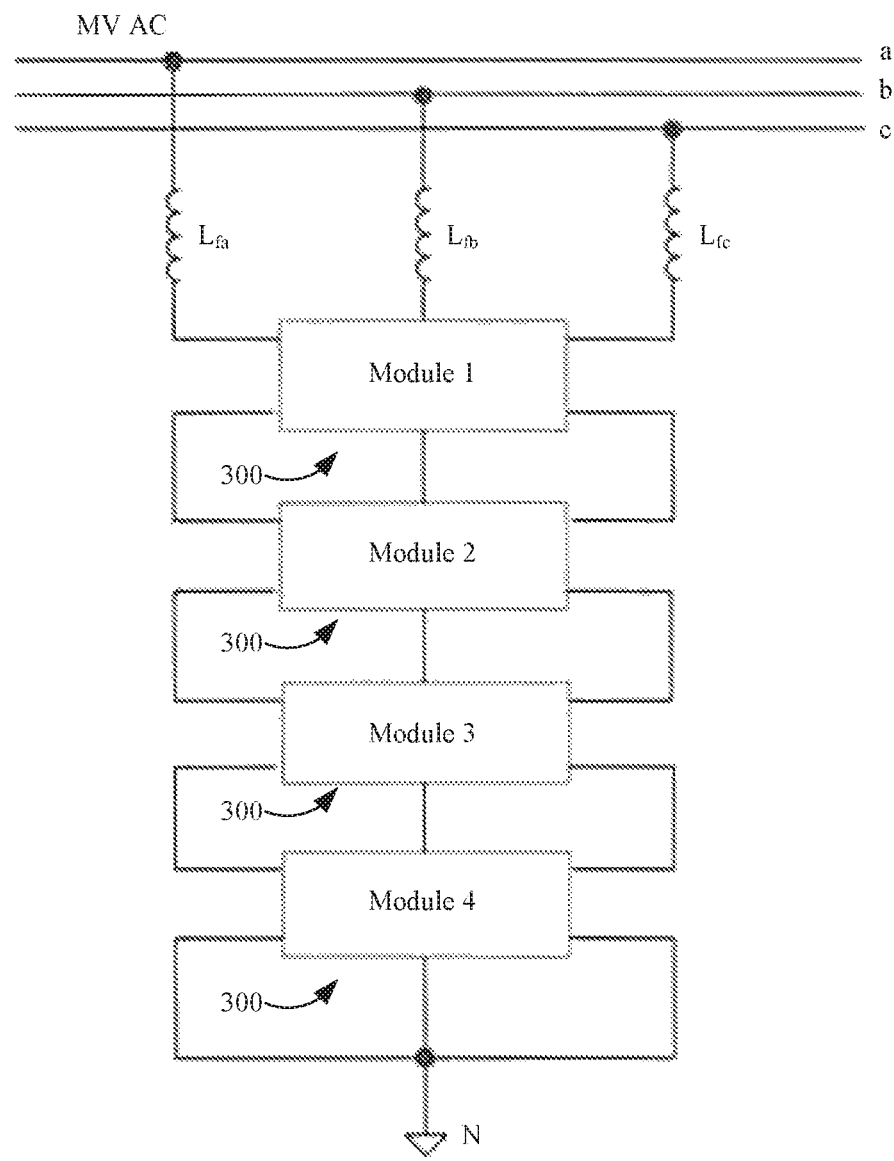
FIG. 10 is a schematic diagram illustrating an example of a multi-level VAr compensator, in accordance with various embodiments of the present disclosure.

VAr compensation can also be achieved by stacking converter modules. FIG. 10 illustrate an example of a MV VAr compensator using a plurality of VAr compensators 300 shown in FIG. 8. For module 1, the high side of each phase is connected to the appropriate phase of the MV AC line via output inductors ($L_f$), and the low side of each phase is connected to the corresponding high side of module 2. In a similar fashion, the low side of each phase in module 2 is connected to the corresponding high side of module 3 and the low side of each phase in module 3 is connected to the corresponding high side of module 4, with the low sides of module 4 being connected to a common neutral point.

Operation of the converter topologies 100, 200 and 300 will now be discussed. During operation, a constant DC current is maintained across the magnetizing inductance of the HF transformer 103 (or the inductor 203) during the entire switching cycle. The (magnetizing) inductance is charged and discharged by the input and output sides, respectively. Over one switching cycle, the isolated converter 100 experiences the following three types of states: 1) five active states in which the transformer magnetizing current flows through input or output CSI bridges 106 and the magnetizing inductance is being charged and discharged by the input and output voltages; 2) one zero voltage transition state between any two adjacent active states in which the magnetizing current flows through the resonant capacitors to provide ZVS conditions for turning-off and turning-on the switching devices; and 3) one resonant state in which the capacitor voltage is reset to be ready for next switching cycle operation.

Figure 11:
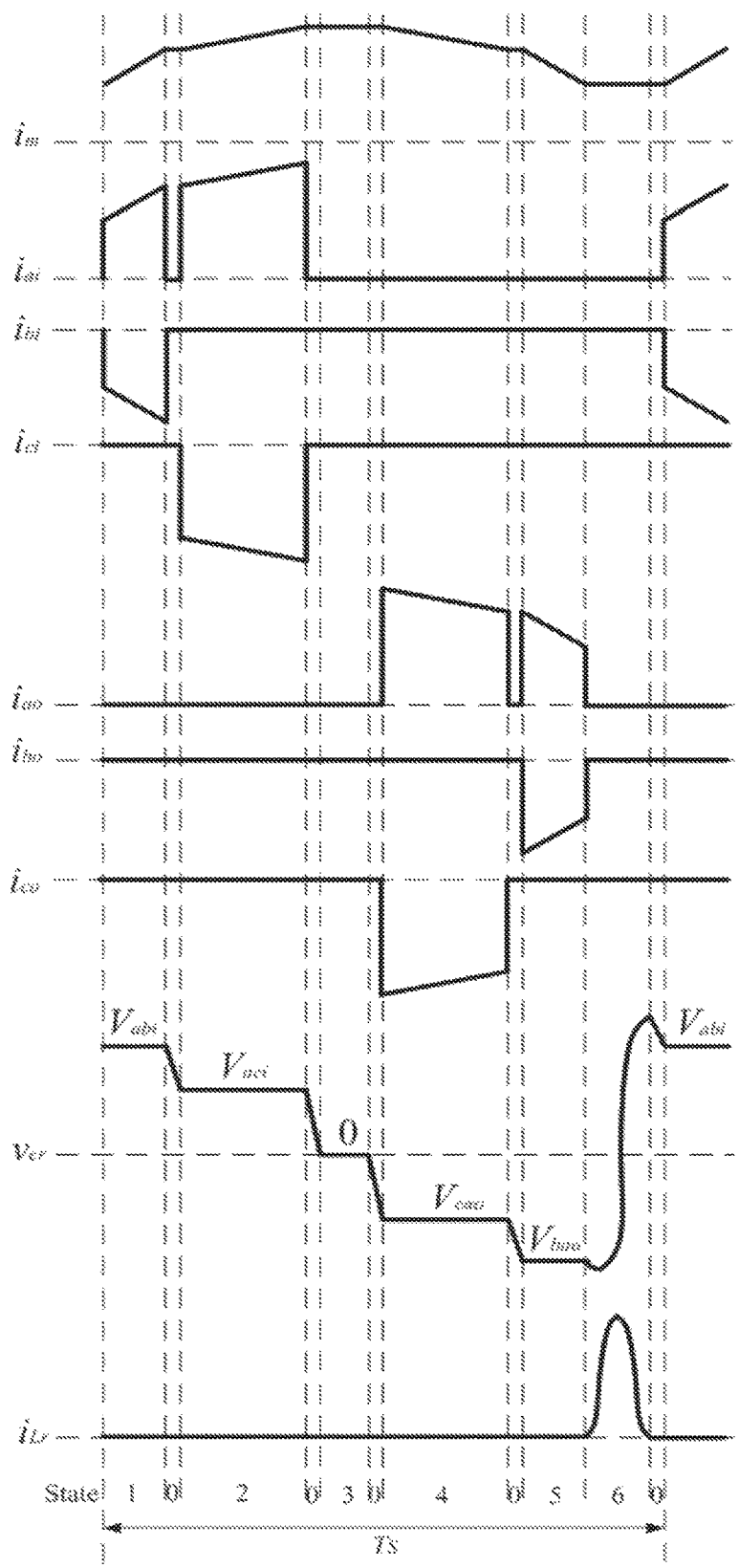
FIGS. 11, 12A-12G and 13 illustrate operation and simulation results of the transformer topology of FIG. 1, in accordance with various embodiments of the present disclosure.

Referring to FIG. 11, shown are conceptualized waveforms illustrating an example of the operation of the converter 100 in FIG. 1. The operation is also applicable to the non-isolated converter of FIG. 2. Within one switching cycle, the HF transformer 103 is connected to the input phase pair which has the highest line-to-line voltage by turning on the switching devices corresponding to that phase. The voltage across the resonant capacitors of the auxiliary resonant circuit 112 will be equal to this line-to-line voltage. The transformer magnetizing inductance (or of the inductor 203 of FIG. 2) is being charged by the applied voltage. And thus the magnetizing current increases linearly. This can be seen in the magnetizing current ($i_m$) in FIG. 11. The energy is temporarily stored in the HF transformer 103 (or inductor 203). The duty cycle of this state is determined by the reference current on the AC side. Turning-off the devices will occur under a ZVS condition because the resonant capacitor in the auxiliary resonant circuit 112 limits the dv/ft after the devices are turned off.

The capacitors are charged by the magnetizing current and thus its voltage starts dropping from the highest line-to-line voltage. The incoming device can then be gated-on. However, there is no current flowing through the devices since the switching devices are reverse blocked. When the resonant capacitor voltage drops to the incoming phase pair voltage level, the device is automatically forward biased. This sequence is repeated until the last phase pair which has the most negative voltage value is connected to the HF transformer 103 (or inductor 203). After that, the switch of the auxiliary resonant circuit 112 is turned on under a ZCS condition to initiate the resonant operation between the capacitor and the inductor of the auxiliary resonant circuit 112.

When the inductor current ($i_{Lr}$) drops to zero, the switch of the auxiliary resonant circuit 112 can be turned off under ZCS condition. As a result, the voltage polarity of the resonant capacitor is flipped. The capacitor voltage should reach a value larger than the highest line-to-line voltage, which can be achieved by charging the resonant capacitor of the auxiliary resonant circuit 112 such that its voltage drops to a more negative value before starting the resonant operation. After the resonant operation, the next switching cycle under ZVS operation can start.

A more detailed discussion of the principles of operation will now be presented. In the steady state, the converter 100 maintains a constant DC current through the transformer magnetizing inductance. For the five active states, the duty cycle of each state can be determined by the actual charge delivered to the specific terminal over each switching cycle. The device duty cycle dT is governed by:

$$\int_0^{dT} I_m t = Q^* \tag{1}$$

$$I_g^* = Q^*/T, \tag{2}$$

where $I_m$ is the DC current flowing through the transformer magnetizing inductance $L_m$, $I^*_g$ is the referenced line current, and T is the switching period.

Figure 12A:
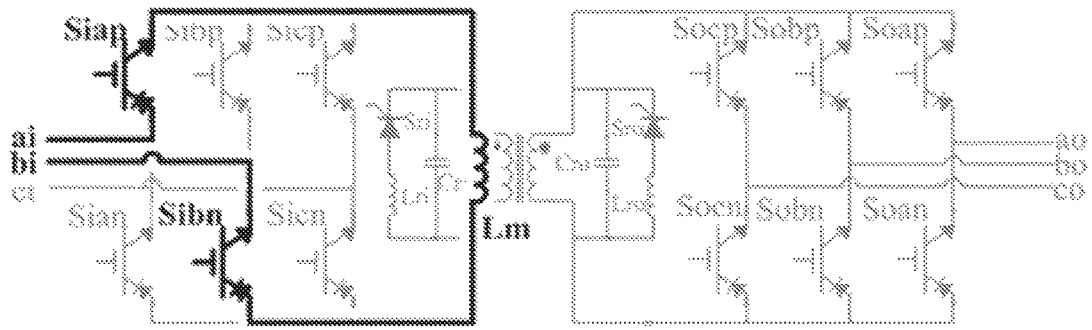
Figure 12B:
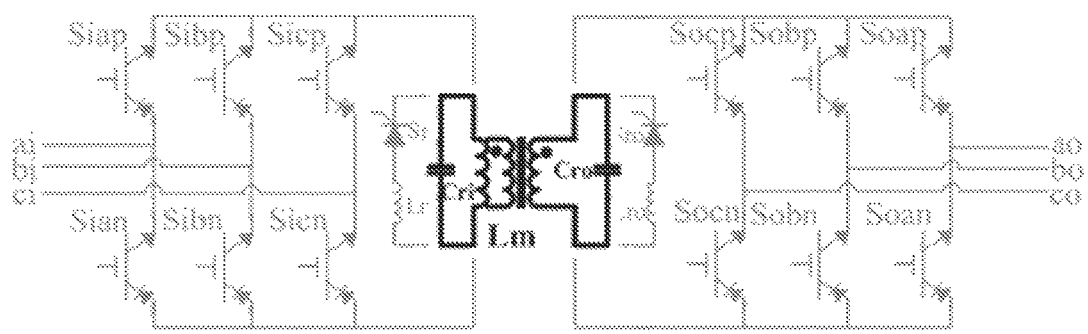
Figure 12C:
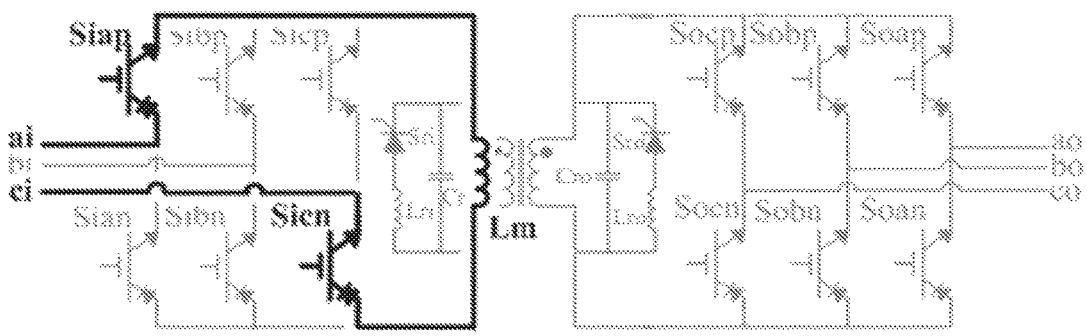

The circuit states corresponding to the operating states of FIG. 11 are shown in FIGS. 12A-12G. An overall cycle can be summarized as follows. The 'charging' cycle where the current in the transformer magnetizing inductance is built up includes two active states. As illustrated in FIG. 12A, the incoming line-line voltage with the highest voltage level ($a_i$ and $b_i$ in this example) is connected to the HF transformer 103, corresponding to state 1 in FIG. 11, to charge the magnetizing inductance. The magnetizing current flowing through the resonant capacitors $C_{ri}$ and $C_{ro}$ causes the voltage across the transformer to vary with a controlled dv/dt rate until device $S_{icn}$ begins to conduct. This is the ZVS transition state (state 0 in FIG. 11) illustrated in FIG. 12B. This allows zero turn-off loss for device $S_{ibn}$ and zero turn-on loss for device $S_{icn}$. After a time determined by equations (1) and (2), device $S_{ibn}$ is turned off and device $S_{icn}$ is turned on, as shown in FIG. 12C. This corresponds to state 2 of FIG. 11, where the magnetizing inductance continues to charge.

Figure 12D:
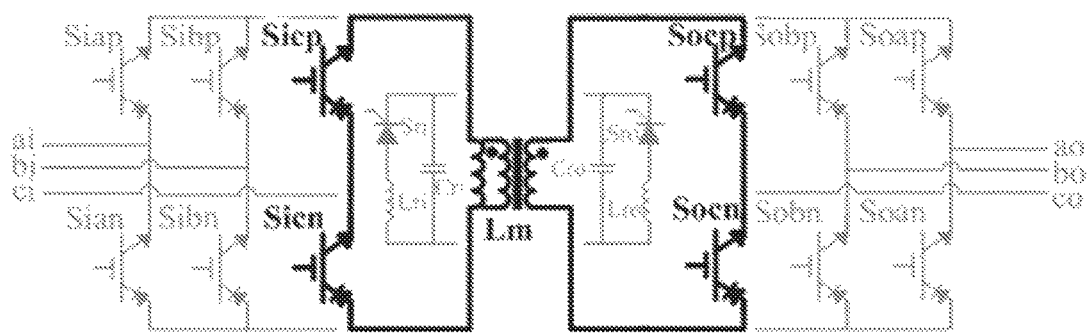

When the circuit controller determines that device $S_{icn}$ should be turned off, the same process is repeated, with the input CSI converter 106 entering a free-wheeling mode as shown in FIG. 12D. The output CSI bridge 106 now continues the process, discharging the transformer magnetizing current, while continuing the process of moving from state to state, using ZVS transitions to achieve the desired soft switching. The discharge cycle ends when the line-line voltage with the highest magnitude on the output side is connected across the HF transformer 103. At this point, a resonant transition is enabled by the auxiliary resonant circuit 112, which resets the voltage across the resonant capacitors, and sets up the conditions for the next switching cycle. The process following the sequence of states shown in FIG. 11 is described in greater detail below:

State 1: Charging the Magnetizing Inductance with the First Line-to-Line Input Voltage.

As illustrated in FIG. 12A, the HF transformer 103 is connected to phase $a_i$ and $b_i$ by turning on devices $S_{iap}$ and $S_{bin}$. The voltage across the resonant capacitor of the auxiliary resonant circuit 112, which is $V_{Cr}$, equals the first line-to-line input voltage $V_{abi}$. The transformer magnetizing inductance $L_m$ is being charged by the applied voltage $V_{abi}$, and thus the magnetizing current $i_m$ increases linearly. State 1 ends when the average current delivered to phase $b_i$ over one switching cycle is equal to its reference current, as governed by equation (2).

State 0: ZVS Transition State.

As illustrated in FIG. 12B, switch $S_{ibn}$ is turned off, causing the magnetizing current to flow through the resonant capacitor of the auxiliary resonant circuit 112, providing a significantly reduced dv/dt rate. Switch $S_{ibn}$ can be turned off with zero switching loss. The resonant capacitors are charged by $i_m$ and its voltage starts dropping from $V_{abi}$. Within this state 0, the incoming device $S_{icn}$ can be gated-on.

However, there is no current flowing through the devices since $V_{Cr}$ is larger than $V_{aci}$ and the devices are reverse blocked. This state ends when $V_{Cr}$ drops to a value equal to $V_{aci}$, then devices $S_{iap}$ and $S_{icn}$ conduct. Device $S_{icn}$ is actually turned on with zero switching loss.

State 2: Charging the Magnetizing Inductance with the Second Line-to-Line Input Voltage.

Devices $S_{iap}$ and $S_{icn}$ conduct, and $L_m$ is charged by $V_{aci}$. As shown in FIG. 12C, the magnetizing current $i_m$ linearly increases again, and $V_{Cr}$ equals to $V_{aci}$. State 2 continues until the average current delivered to phase c, over one switching cycle equals its reference.

State 0: ZVS Transition State.

Devices $S_{iap}$ and $S_{icn}$ are turned off under ZVS conditions. As illustrated in FIG. 12B, the resonant capacitors of the auxiliary resonant circuit 112 are charged by $i_m$ again until its voltage drops to zero.

State 3: Freewheeling.

The converter 100 enters the freewheeling state 3 by turning on devices $S_{icp}$ and $S_{icn}$ of the input CSI bridge 106 as well as devices $S_{ocp}$ and $S_{ocn}$ of the output CSI bridge 106 under ZVS conditions. As shown in FIG. 12D, the magnetizing current $i_m$ flows through these two phase legs rather than flowing to the input/output terminals. $V_{cr}$ equals to zero at this state.

State 0: ZVS Transition State.

Devices $S_{icp}$, $S_{icn}$, and $S_{ocn}$ are turned off under ZVS conditions. As shown in FIG. 12B, the resonant capacitors are charged by $i_m$ again and its voltage starts dropping to a negative value.

State 4: Discharging the Magnetizing Inductance with the First Line-to-Line Output Voltage.

Figure 12E:
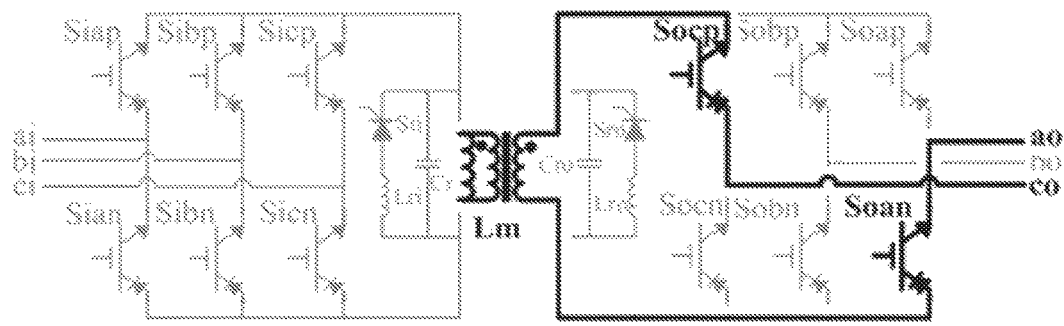

As shown in FIG. 12E, devices $S_{ocp}$ and $S_{oan}$ conduct under ZVS conditions, and $L_m$ is discharged by $V_{cao}$. $V_{cr}$ equals to $V_{cao}$. State 4 ends when the average current delivered to phase $c_o$ over one switching cycle is equal to its reference.

State 0: ZVS Transition State.

Device $S_{ocn}$ is turned off under ZVS condition. As shown in FIG. 12B, the resonant capacitors are charged by $i_m$ again until its voltage equals to $V_{bao}$.

State 5: Discharging the Magnetizing Inductance with the $2^{nd}$ Line-to-Line Output Voltage.

Figure 12F:
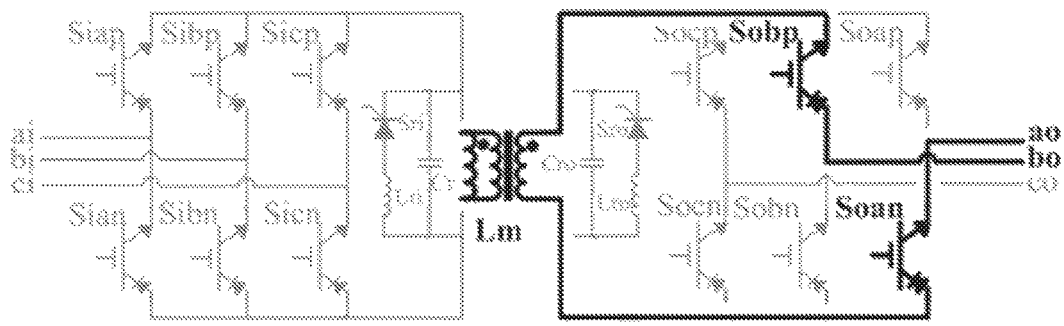

As shown in FIG. 12F, devices $S_{obp}$ and $S_{oan}$ conduct under ZVS conditions, and $L_m$ is discharged by $V_{bao}$. $V_{cr}$ equals to $V_{bao}$. State 5 ends when the average current delivered to phase $b_o$ over one switching cycle equals to its reference.

State 6: Resonant.

Figure 12G:
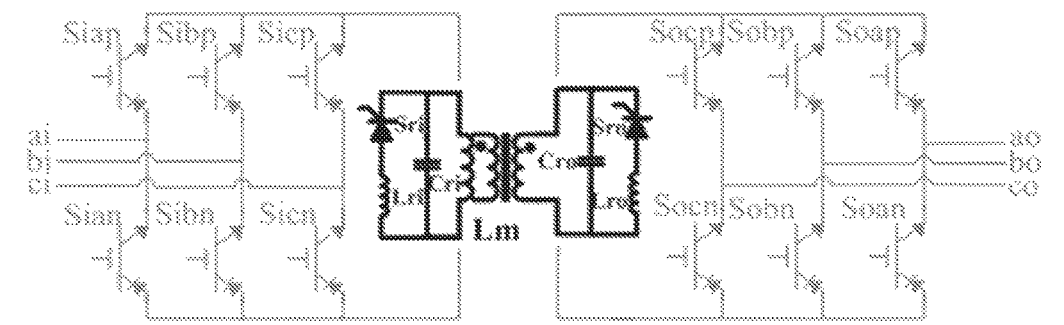

Devices $S_{obp}$ and $S_{oan}$ are turned off under ZVS conditions. As shown in FIG. 12G, auxiliary switch $S_r$ is turned on under ZCS condition to initiate the resonant operation between $L_r$ and $C_r$. State 6 ends when the current through $L_r$ drops to zero, and $S_r$ is turned off under ZCS condition. As a result, the voltage polarity of $C_r$ is reversed. Since the current through the auxiliary switch $S_r$ self-commutates to zero, devices such as silicon controlled rectifiers (SCRs) can be used for $S_r$. The two auxiliary resonant circuits 112 can be simultaneously activated to start the resonant operation rather than being controlled individually.

State 0: ZVS Transition State.

After the resonant operation, the capacitor voltage reaches a value larger than the highest line-to-line voltage $V_{abi}$ again. To ensure this, a state 0 can be flexibly inserted between state 5 and state 6 to deliver more energy to the capacitor if needed such that the capacitor voltage can always resonate to a voltage level higher than $V_{abi}$. Then the incoming devices $S_{iap}$ and $S_{ibn}$ can be turned-on under ZVS condition. Resonant capacitors are charged by $i_m$ until its voltage drops to a value that is equal to $V_{abi}$, which starts the operating of next switching cycle.

The transition from one CSI bridge 106 to another CSI bridge 106 (e.g., the transition from state 2 to 3) incurs a leakage energy transition. For the converter, the energy trapped in the transformer leakage inductance is automatically managed through the resonance between the leakage inductance and the two resonant capacitors in the auxiliary resonant circuits 112. The voltage difference between these two resonant capacitors tends to drive the outgoing bridge current down to zero and simultaneously build up the incoming bridge current, achieving a leakage management for bridge-to-bridge transitions. This procedure occurs automatically and it does not need an additional switching state as in the Dyna-C. The time spent on leakage energy transfer is sub-microseconds, which slightly reduces the duty cycle for active power transfer through the HF transformer 103. Therefore, to avoid affecting normal performance, the transformer leakage inductance should be kept low.

During the entire switching cycle, the resonant capacitors in the auxiliary resonant circuits 112 provide ZVS transition for turning off the output devices and turning on the input devices. ZVS transitions occur in a passive manner in which the transformer magnetizing current automatically transfers between the active devices and the resonant capacitors. As a result, the converter does not require any intentionally added dead-time or overlap-time for device transitions. The auxiliary device is only operated once at the end of each switching cycle to reset the resonant capacitor voltage. Unlike other resonant converters which involve great complexity, the passive ZVS transitions simplifies the converter control.

In addition, unlike the DAB converter which has a limited soft-switching range, the converters can achieve ZVS operation over a full load range. From the above operating principle, it can be seen that device turn-off always occurs under ZVS conditions. To ensure ZVS turn-on, the resonant capacitor voltage should be higher than the incoming line-line voltage when the device is gated-on, which means the device being turned-on should always be reverse biased when positive gate voltage is applied. Over one switching cycle, before state 5, ZVS turn-on can be guaranteed as long as the device gate is turned on before the end of state 0. After state 5, the resonant capacitor voltage $V_{cr}$ drops to the lowest negative value. To ensure ZVS operation for the subsequent switching cycle, $V_{cr}$ needs to reach a value higher than that of the incoming highest positive voltage (e.g., $V_{abi}$ in FIGS. 12A-12F) after completion of the resonant operation for state 6. This can be achieved as long as $V_{cr}$ magnitude (with a negative value) is larger than $V_{abi}$ before starting state 6. To satisfy this, a state 0 can be flexibly added between state 5 and state 6.

Under voltage-boost operation in which the amplitude of the output is higher than the input, state 6 can occur immediately after state 5. In this case, $V_{cr}$ equals to $V_{bao}$ after state 5, whose magnitude is larger than $V_{abi}$ for the voltage-boost case. Therefore, $V_{cr}$ can always reach a value higher than $V_{abi}$ after the resonant operation of state 6. Under voltage-buck operation, however, the amplitude of $V_{bao}$ is lower than $V_{abi}$. In that case, state 0 is needed after state 5. $V_{cr}$ will be charged to a large negative value to ensure that it can be resonated to a value higher than $V_{abi}$ after state 6. Since the resonant capacitor is quite small while the DC current is fairly stiff, the capacitor voltage can be charged to a very large negative value after state 5, and it can reach a very high positive value after the resonant operation. Overall, by flexibly adding a state 0 between state 5 and state 6, the ZVS operation over a full load range is guaranteed, regardless of the input and output voltage amplitudes.

Figure 13:
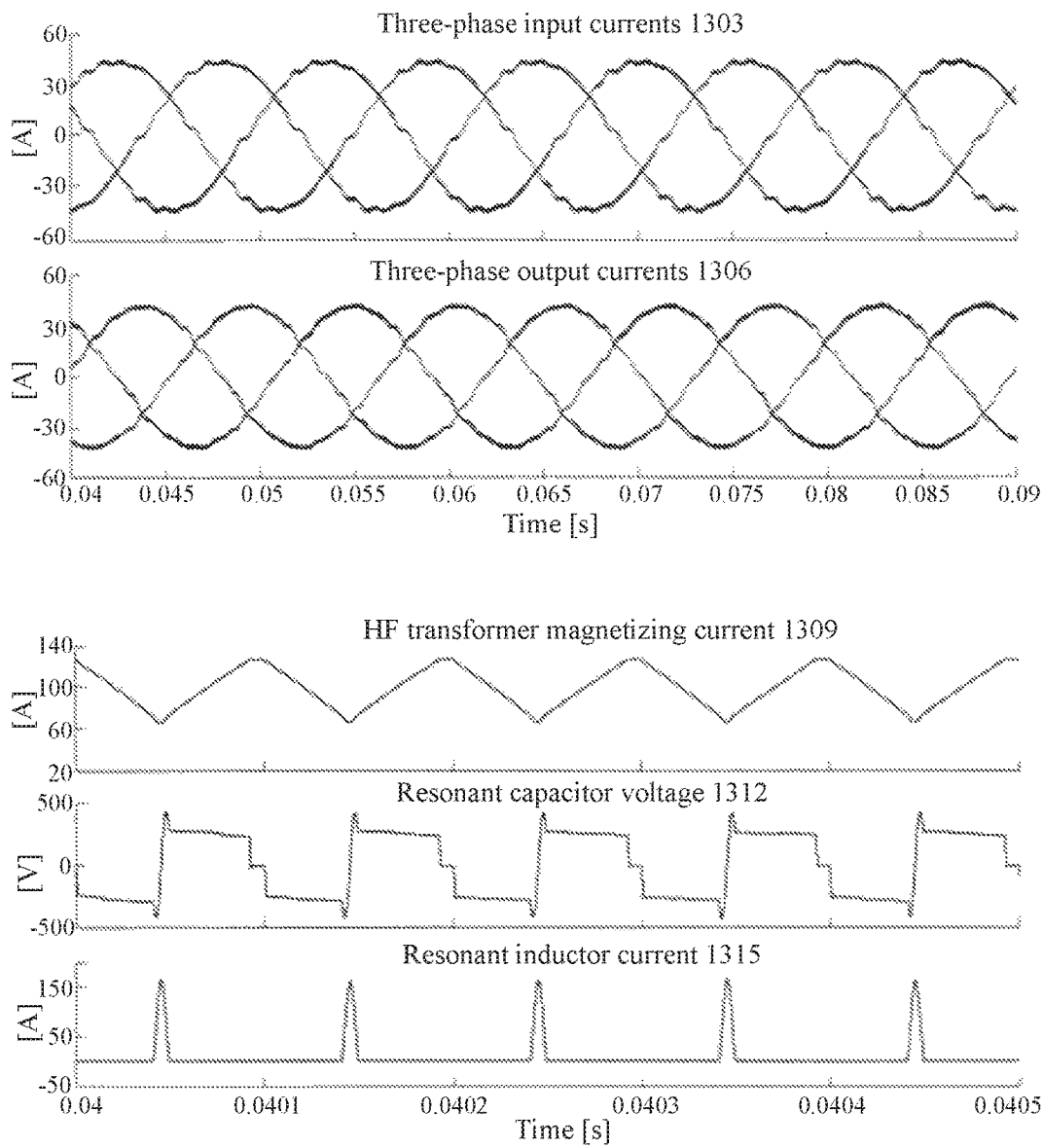

FIG. 13 shows the simulated waveforms of the input currents 1303 and output currents 1306, the magnetizing current 1309 of the HF transformer 103, the voltage 1312 on the capacitor of the auxiliary resonant circuit 112, and the current 1315 flowing through the inductor of auxiliary resonant circuit 112. A prototype rated at 208 V/10 kVA was fabricated. The converter 100 was designed with high-current rated multi-layer PCB boards. Silicon IGBTs were connected in series with silicon-carbide diodes to implement the CSI bridges 106. A customized DSP/FPGA based controller board was used to control the converter 100. The HF transformer 103 was designed to have a magnetizing inductance of 180 pH with a current carrying capability of 160 A. Nano-crystalline core and wide copper windings were used for the HF transformer design to provide low core loss and low winding loss. The HF transformer 103 was designed to have interleaved primary and secondary windings, achieving a low leakage inductance of 740 nH. Kapton tape provided multi-kV isolation between layers. For this implementation, both input and output ports were connected to the same 3-phase, 208 V supply so as to circulate the power without having to dissipate it. As presented in "Soft-Switching Solid State Transformer (S4T)" by Hao Chen and Deepak Divan (2016 IEEE Energy Conversion Congress and Exposition, Sep. 18-22, 2016), which is hereby incorporated by reference in its entirety, the test results closely matched the conceptual waveforms and simulation waveforms of FIGS. 11 and 13.

Transformer. The HF transformer 103 acts as a temporary energy storage element for power transfer between the input and the output. The transformer core should be gapped for energy storage. The transformer magnetizing inductance and its current carrying capability determine the size of the transformer. Excluding the effect of the resonant period, which is small comparing with the entire switching cycle, the minimum average value of the transformer magnetizing current should satisfy:

$$I_{m.ave} = I_{ip} + I_{op}, \quad (3)$$

(assuming a 1:1 turns ratio transformer), in which $I_{ip}$, $I_{op}$ are the peak current of the input and the output. If the transformer magnetizing current is regulated at a value much higher than this minimum value, a longer free-wheeling state will be required, which will lead to higher conduction loss. The HF transformer can be biased using permanent magnets mounted in the air gap. Such biasing can significantly reduce the size of the HF transformer 103.

Unlike conventional CSIs, the HF transformer 103 can be designed to have a lower magnetizing inductance to maintain a compact transformer design. However, this will lead to larger DC current ripples, which will in turn result in high peak current stress and higher core loss. The maximum DC current ripple can be given by $$\Delta I_{m.max} = 2V_{ip}V_{op}/\sqrt{3}f_s L_m(V_{ip}+V_{op}). \quad (4)$$

To avoid discontinuous conduction mode in which the dc current drops to zero, the following condition should be satisfied:

$$f_s L_m > V_{ip}V_{op}/\sqrt{3}(V_{ip}+V_{op})(I_{ip}+I_{op}). \quad (5)$$

In these equations, $V_{ip}$ and $V_{op}$ are the peak line-to-line voltage of the input and output, $L_m$ is the transformer magnetizing inductance, and $f_s$ the converter switching frequency.

Figure 14:
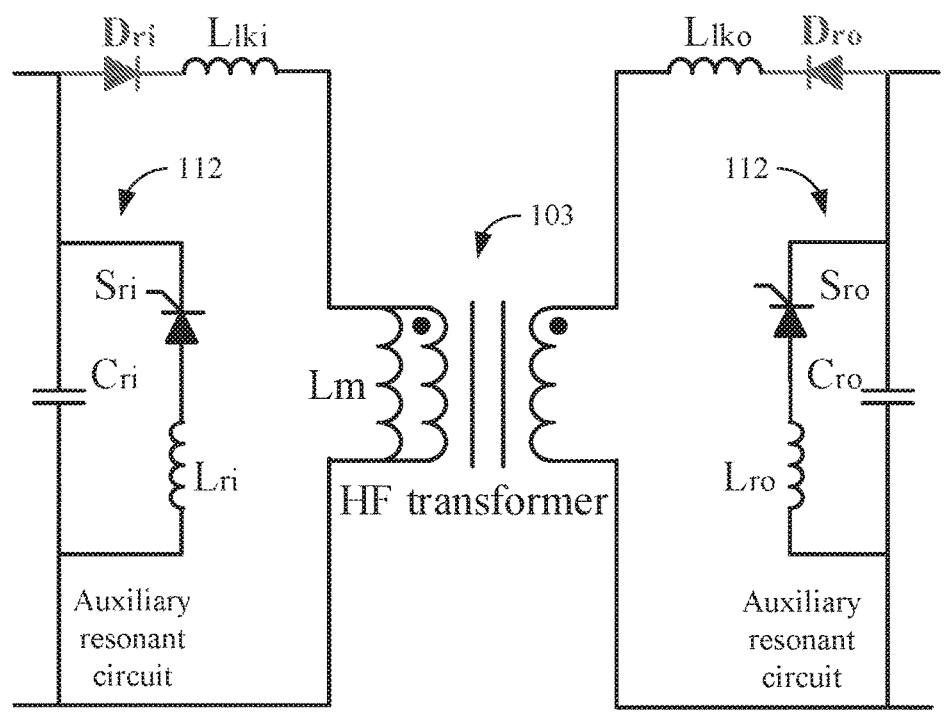
FIG. 14 is a schematic diagram illustrating an example of leakage inductance compensation for the transformer and converter topologies of FIGS. 1-8, in accordance with various embodiments of the present disclosure.

The transformer leakage inductance should be kept low. This can be achieved by using wide copper foil for the windings and layering the primary and secondary windings on top of each other. If low leakage inductance cannot be maintained, it will tend to significantly resonate with the capacitors at transitions. An effective solution is to connect diodes in series with the transformer, as shown in FIG. 14. Diodes with low voltage drop and low reverse recovery current (e.g. silicon-carbide diodes) are preferred to minimize losses.

When considering the transformer leakage effect, the capacitor of the auxiliary resonant circuit 112 can sink the transformer leakage energy in a passive manner. This avoids using an additional leakage management strategy and thus eliminates all the associated issues. During the transition from one CSI bridge 106 to another CSI bridge 106, the two resonant capacitors locates on the primary and secondary sides of the HF transformer 103, will be simultaneously charged by the magnetizing inductance. However. It should be noted that during the transition, the leakage inductance will tend to resonate with these two capacitors in the auxiliary resonant circuits 112. If the HF transformer 103 is designed to have low leakage inductance, the resonance can be neglected. Also, the winding resistance of the HF transformer 103 will also help quickly damping the resonance. However, if the leakage inductance is non-negligible, the resonance may cause the winding current of one CSI bridge 106 to flow in a reverse direction, and thus the winding current of the other CSI bridge 106 is higher than the magnetizing current. This phenomenon may result in a failure in the operation for the converters. To overcome a severe resonant issue, two additional diodes Dri and Dro can be connected in series with the HF transformer 103 to stop the resonance. FIG. 14 illustrates an example of the placement of the two diodes Dri and Dro (and inductors Lki and Liko) between the HF transformer 103 and the auxiliary resonant circuit 112.

Semiconductor Devices.

The main devices of the converters 100/200 are stressed at 2 p.u. current, which is the optimum value to maintain the transformer magnetizing current at. However, since the duty cycle of each device is less than 0.5, the converter does not suffer from heavy thermal burden. The semiconductors usually can be stressed at a high current level when the duty cycle is small. In addition, ZVS operation removes all the switching losses, which further reduces the thermal stress of the switching devices. Since the converter only has conduction loss, devices with low voltage drop are preferred such that overall efficiency will be high.

Auxiliary Resonant Circuits.

The auxiliary resonant circuits 112 are located outside the main power transfer path, and thus have very low loss. The resonant capacitors should be large enough such that the turn-off loss of the main devices can be minimized to almost zero. However, relative low capacitance is preferred so as to keep the resonant period to a small part of the switching cycle, and to reduce the circulating element losses. For similar reasons, a small resonant inductor is also preferred. On the other hand, small inductance can lead to high peak current stress for the auxiliary devices within state 6. However, the duty cycle of this device is very small, and it is operated under ZCS conditions with low losses.

Converter Switching Frequency.

Although the converter 100/200 does not have significant switching loss, the switching frequency cannot be set arbitrarily high. This is because the converter needs to spend time on state 0 (ZVS transition state) and state 6 (resonant state). If the switching frequency is too high, the duty cycle of these two types of states will be large, which would then require high magnetizing current, leading to higher losses. It should be noted that a relatively small value of magnetizing inductance gives unprecedented flexibility in dynamically controlling the DC magnetizing current so as to achieve low losses and wide control range.

Filters.

The filter capacitors in the filter circuits 109 provide energy filtering on a switching cycle-to-cycle basis and ensure sinusoidal output voltages on the input and output of the transformer or converter. Filter capacitors should be large enough such that their voltage ripple is maintained within an acceptable range. The reactive power effect should also be considered when selecting capacitance values. The capacitive filters also ensure very low dv/dt and low EMI.

A group of soft-switching circuits with high-frequency isolation has been presented in this disclosure. The transformers and converters retain the benefits of the four-quadrant flyback cycloconverter including: 1) four-quadrant power transfer with voltage step-up and step-down capability; 2) a reduced power conversion stage with minimal device counts; 3) elimination of the bulky DC energy storage capacitors; 4) freedom from inrush current; 5) fast dynamic current control by directly regulating injected line currents; and 6) a modular structure that can be scales to high-voltage and high-power levels. Additionally, all the devices are switched under soft-switching conditions, which eliminates the switching loss to improve the converter efficiency, and reduces the dv/t rate at switching transitions to mitigate the EMI issue. The transformer or converter operation is simplified by removing the overlap states for phase leg transitions and the leakage management states for bridge-to-bridge transitions. Even though resonant operation is involved, the disclosed converters retain the pulse-width-modulation (PWM) capability of hard-switching circuits. The converters are reliable and its protection is easy to implement. Flexible circuit configurations are available for connecting two-terminal or multi-terminal DC, single-phase and multi-phase AC systems. Converter modularity also allows scaling to medium-voltage and high-power levels though serial and/or parallel connection of the converter modules.

Applications include locomotives, light rail, EV fast chargers, photovoltaic (PV) inverters, and battery energy storage systems—many of them emerging fields. It could also include specialized bidirectional drives where 60 hertz isolation transformers are often used to manage noise and transient injection into long cables or motors, along with converters to condition the voltage applied to the motor. As an example, a tri-port topology shown in FIG. 15 utilizes the converter 100 of FIG. 1, but is configured to interface with PV, battery, and three-phase grid as illustrated. Such a configuration could also be used as a motor drive. The disclosed soft switching solid state transformers and converters 100/200 have many unique attributes that offer advantages over existing topologies. The application of the disclosed topologies offers may advantages as four quadrant motor drives with high frequency links. In addition to significantly reducing the complexity of existing drive systems, the operation of the disclosed topologies provides controllable sinusoidal outputs with substantially no high frequency components, which effectively eliminates the presence of bearing currents and insulation considerations, in addition to significantly reducing the input and output filtering. The following illustrates other advantages provided by the disclosed topologies.

Ease of Control.

The ZVS soft-switching range is independent of load current, a significant advantage when compared with DAB based three-stage solid state transformers. Further, a wide range of turn-on and turn-off times provides ease of control at the individual device level. ZVS operation is not sensitive to resonant circuit parameters, and full PWM fixed-frequency capability is retained. The fundamental frequency control for the transformer or converter 100/200 uses the instantaneous actual magnetizing current to estimate the duty cycle of each switch. This results in very clean harmonic-free voltage waveforms at the input and output, even as the magnetizing current amplitude varies significantly.

Robustness.

For the DAB based three-stage solid state transformer (SST), bulky DC capacitors are needed to support the DC buses on both sides. This impacts the robustness and reliability of such SSTs. Inrush currents have to be managed at start-up, shutdown, and under grid fault conditions. Under short circuit and fault conditions, de-saturation protection and soft turn-off are required to avoid inductive voltage spikes. This can be particularly challenging for silicon-carbide devices, which may be needed to get to higher voltage levels. By way of contrast, the disclosed transformers and converters 100/200 provide current limiting, and eliminate inrush currents under both start-up and fault conditions. De-saturation protection is not needed for the devices making the gate driver design simpler.

The disclosed transformers and converters 100/200 are also highly differentiated from conventional CSIs. Interrupting current flow in a CSI, for instance due to a loss in control power, can quickly result in a voltage spike across the devices. The high dv/dt under open-circuit failure for CSIs requires a very fast acting overvoltage protection scheme. However, for the transformers and converters 100/200, since the resonant capacitors significantly reduce the dv/ft rate, the devices can be easily protected by only connecting MOVs in parallel with the resonant capacitors, and by independent turn-on of the resonant circuit devices if needed.

In addition, the transformers and converters 100/200 offer several advantageous features that conventional VSIs and CSIs do not offer 1) the converter does not require any intentionally added dead time or overlap time for switching device transitions; 2) there is no severe inrush current when switching devices on the same phase leg are turned-on simultaneously by fault; 3) the switching devices do not suffer from catastrophic voltage stress when interrupting the inductive current flowing path; and 4) reduced dv/t rate significantly mitigates all the hard-switching issues such as resonance, spikes, noise, and EMI.

Fast Dynamic Response.

The transformers and converters 100/200 can be operated under charge control, which delivers the needed charge to input and output terminals on a cycle-by-cycle basis. This indicates that the source and load current can be controlled with very fast dynamic response. An external current control loop is not needed to regulate the line current as in the conventional VSI, and a fast step response of several switching cycles can be achieved.

To optimize the transformer or converter efficiency, the transformer magnetizing current level can be varied according to the load current. This will decrease the time period of the freewheeling state and will reduce conduction losses. However, for conventional CSIs, dynamically changing the DC current according to load levels can slow down response because of the large inductor. For the transformers and converters 100/200, the transformer magnetizing inductance can be made relatively small, which reduces the system inertia. As a result, the transformer magnetizing current can be built up and driven down to a new reference value within several switching cycles. In addition, the HF transformer 103 can have a compact design and lower conduction losses due to the smaller magnetizing inductance that is acceptable.

Modular Design.

The minimal topology lends itself to very efficient packaging. If RB-IGBTs are used, the packaging becomes even simpler. The absence of bulky DC capacitors and the ability to achieve higher switching frequencies reduces the transformer size, while ZVS allows smaller heat-sinks.

The transformers and converters 100/200 also allow for scaling to higher voltage and power levels. Using available silicon devices above 1700 volts entails severe compromises in switching speed and losses. Even with emerging high-voltage silicon-carbide devices, the ability to realize grid-connected converters will need series connection of devices or modules. The transformers and converters 100/200 offer unique advantages in scaling for higher voltage/power. For instance, a traction drive could be realized with a converter module that has single-phase on the high-voltage side, and a three-phase converter on the low-voltage side. The single-phase converters could be stacked in series, while the three-phase converters could be paralleled to drive the traction motor. This topology could realize fully bidirectional power flow, simple converter design, and high efficiency.

Figures 15, 16:
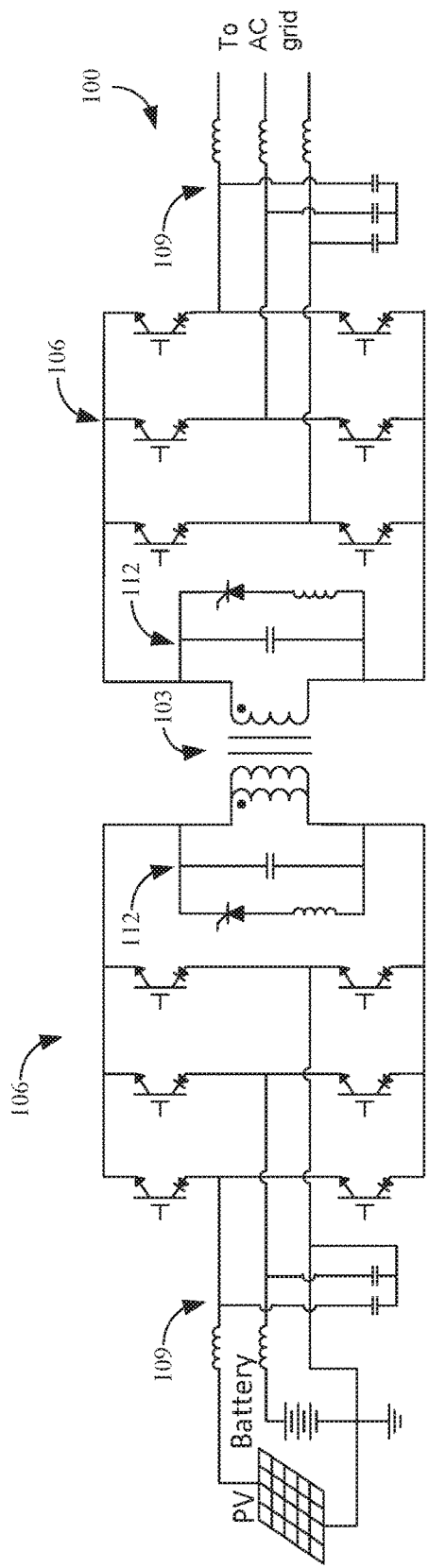
FIG. 15 is a schematic diagram illustrating the use of the soft switching isolated converter topology of FIG. 1 with photovoltaics (PV), a battery and connection to an AC grid, in accordance with various embodiments of the present disclosure.
FIG. 16 is a table comparing the disclosed soft switching solid state power transformer with a conventional solid state transformer and a low-frequency transformer with a rectifier and an inverter, in accordance with various embodiments of the present disclosure.

The table in FIG. 16 summarizes the comparison of various topologies when implementing a three-phase 480 V/50 kVA solid state transformer with a switching frequency of 15 kHz. The comparison includes the disclosed soft switching solid state power transformer, the conventional DAB based multi-stage SST, and the low-frequency transformer with a rectifier and an inverter. Compared with the other two solutions, even though the device current rating for the transformer is 2 p.u., it does not have severe fault inrush current thanks to its current limiting capability. In particular, the soft switching solid state power transformer stands out with its features of lower device count, full-range of soft-switching, and high efficiency.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to y" includes "about 'x' to about 'y'".

Therefore, at least the following is claimed:

1. A soft switching solid state power transformer, comprising:
   a high frequency (HF) transformer comprising first and second winding connections;
   a first auxiliary resonant circuit coupled to the first winding connection of the HF transformer, the first auxiliary resonant circuit comprising a resonant capacitor coupled across the first winding connection;
   a first current-source inverter (CSI) bridge coupled to the first auxiliary resonant circuit, the first CSI bridge comprising reverse blocking switch assemblies that conduct current in one direction and block voltage in both directions;
   a second auxiliary resonant circuit coupled to the second winding connection of the HF transformer, the second auxiliary resonant circuit comprising a resonant capacitor coupled across the second winding connection; and
   a second CSI bridge coupled to the second auxiliary resonant circuit, the second CSI bridge comprising reverse blocking switch assemblies that conduct current in one direction and block voltage in both directions.

2. The soft switching solid state power transformer of claim 1, wherein the first CSI bridge comprises at least two phase legs, each phase leg comprising a pair of the reverse blocking switch assemblies.

3. The soft switching solid state power transformer of claim 2, wherein the first CSI bridge comprises three phase legs, each of the three phase legs configured to couple to a different phase of an AC power supply.

4. The soft switching solid state power transformer of claim 3, wherein the first CSI bridge further comprises a fourth phase leg configured to couple to a neutral connection of the AC power supply.

5. The soft switching solid state power transformer of claim 2, wherein the at least two phase legs of the first CSI bridge are configured to couple to a single-phase AC power supply or a DC power supply.

6. The soft switching solid state power transformer of claim 2, further comprising a first filter coupled to the at least two phase legs of the first CSI bridge.

7. The soft switching solid state power transformer of claim 1, wherein the reverse blocking switch assemblies comprise an insulated gate bipolar transistor (IGBT) in series with a diode or a reverse blocking IGBT (RB-IGBT).

8. The soft switching solid state power transformer of claim 1, wherein the second CSI bridge comprises at least two phase legs comprising a pair of the reverse blocking switch assemblies.

9. The soft switching solid state power transformer of claim 8, wherein the at least two phase legs are configured to couple to a load.

10. The soft switching solid state power transformer of claim 9, wherein the load is a single-phase AC load or a DC load.

11. The soft switching solid state power transformer of claim 9, wherein the load is a three-phase AC load, and the second CSI bridge comprises three phase legs configured to couple to different phases of the load.

12. The soft switching solid state power transformer of claim 11, wherein the second CSI bridge further comprises a fourth phase leg configured to couple to a neutral connection of the load.

13. The soft switching solid state power transformer of claim 8, further comprising a second filter coupled to the at least two phase legs of the second CSI bridge.

14. A reactive power compensator, comprising:
    a high frequency (HF) transformer comprising first, second and third winding connections;
    a first auxiliary resonant circuit coupled to the first winding connection of the HF transformer, the first auxiliary resonant circuit comprising a resonant capacitor coupled across the first winding connection;
    a first current-source inverter (CSI) bridge coupled to the first auxiliary resonant circuit, the first CSI bridge comprising reverse blocking switch assemblies that conduct current in one direction and block voltage in both directions;
    a second auxiliary resonant circuit coupled to the second winding connection of the HF transformer, the second auxiliary resonant circuit comprising a resonant capacitor coupled across the second winding connection;
    a second current-source inverter (CSI) bridge coupled to the second auxiliary resonant circuit, the second CSI bridge comprising reverse blocking switch assemblies that conduct current in one direction and block voltage in both directions;
    a third auxiliary resonant circuit coupled to the third winding connection of the HF transformer, the third auxiliary resonant circuit comprising a resonant capacitor coupled across the third winding connection; and
    a third CSI bridge coupled to the third auxiliary resonant circuit, the third CSI bridge comprising reverse blocking switch assemblies that conduct current in one direction and block voltage in both directions.

15. The reactive power compensator of claim 14, wherein the first, second and third CSI bridges comprise two phase legs, each phase leg comprising a pair of the reverse blocking switch assemblies.

16. The reactive power compensator of claim 15, wherein the first, second and third CSI bridges are configured to couple to different phases of a three-phase AC power supply.

17. The reactive power compensator of claim 16, wherein the two phase legs of each of the first, second and third CSI bridges are configured to couple to a phase connection and a common neutral connection.

18. A soft switching solid state converter, comprising:
    an auxiliary resonant circuit coupled across an inductor, the first auxiliary resonant circuit comprising a resonant capacitor coupled across the inductor;
    a first current-source inverter (CSI) bridge coupled across the inductor, the first CSI bridge comprising reverse blocking switch assemblies that conduct current in one direction and block voltage in both directions; and
    a second CSI bridge coupled across the inductor, the second CSI bridge comprising reverse blocking switch assemblies that conduct current in one direction and block voltage in both directions.

19. The soft switching solid state converter of claim 18, wherein the first and second CSI bridges each comprise at least two phase legs, each phase leg comprising a pair of the reverse blocking switch assemblies.

20. The soft switching solid state power converter of claim 19, wherein the first CSI bridge comprises three phase legs, each of the three phase legs configured to couple to a different phase of an AC power supply.

21. The soft switching solid state power converter of claim 20, wherein the first CSI bridge further comprises a fourth phase leg configured to couple to a neutral connection of the AC power supply.

22. The soft switching solid state power converter of claim 19, wherein the at least two phase legs of the first CSI bridge are configured to couple to a single-phase AC power supply or a DC power supply.

* * * * *